United States Patent [19]
Damberg

[11] Patent Number: 5,151,230
[45] Date of Patent: Sep. 29, 1992

[54] PROCESS FOR PRODUCTION OF PRODUCTS FORMED OF POLYMER BONDED AND GRANULATED PARTICLES

[75] Inventor: Dirk H. Damberg, Tappen, Canada

[73] Assignee: Dinoflex Manufacturing Ltd., Salmon Arm, Canada

[21] Appl. No.: 591,476

[22] Filed: Oct. 1, 1990

[51] Int. Cl.$^5$ ............................ B27N 3/00; C08J 5/00; D21B 1/04

[52] U.S. Cl. ........................ 264/83; 264/109; 264/115; 264/122; 264/124; 264/331.13; 264/331.18; 264/331.19; 264/DIG. 69; 264/DIG. 77; 264/DIG. 79

[58] Field of Search ............... 264/109, 122, 124, 82, 264/83, 115, 331.11, 331.13, 331.18, 331.19, 322, DIG. 69, DIG. 77, DIG. 79

[56] References Cited

U.S. PATENT DOCUMENTS

| | | | |
|---|---|---|---|
| 2,033,411 | 3/1936 | Carson | 264/115 X |
| 2,347,233 | 4/1944 | Abernathy | 427/203 X |
| 2,671,733 | 3/1954 | Ostermayer | 264/124 X |
| 2,678,081 | 5/1954 | Rainard et al. | 264/109 X |
| 2,759,837 | 8/1956 | Roberts | 264/331.18 X |
| 2,977,864 | 4/1961 | Pullar | 264/122 X |
| 3,030,251 | 4/1962 | La Bore et al. | 427/203 X |
| 3,072,582 | 1/1963 | Frost | 264/54 X |
| 3,801,421 | 4/1974 | Allen et al. | 264/109 X |
| 3,956,541 | 5/1976 | Pringle | 264/DIG. 69 X |
| 4,028,288 | 6/1977 | Turner | 264/DIG. 69 X |
| 4,243,625 | 1/1981 | Burge | 264/122 X |
| 4,246,211 | 1/1981 | Kuhnel | 264/DIG. 69 X |
| 4,303,602 | 12/1981 | Lichter et al. | 264/122 X |
| 4,414,361 | 11/1983 | Gaul et al. | 264/331.19 X |
| 4,481,335 | 11/1984 | Stark, Jr. | 264/331.13 X |
| 4,528,153 | 7/1985 | Scholl et al. | 264/122 X |
| 4,609,513 | 9/1986 | Israel | 264/122 |
| 4,826,638 | 5/1989 | Hopperdietzel | 264/DIG. 69 X |
| 4,933,232 | 6/1990 | Trout et al. | 264/109 X |
| 4,970,043 | 11/1990 | Doan et al. | 264/DIG. 69 X |

FOREIGN PATENT DOCUMENTS

| | | | |
|---|---|---|---|
| 2010575 | 9/1971 | Fed. Rep. of Germany | 264/322 |
| 84941 | 7/1981 | Japan | 264/86 |
| 144945 | 11/1981 | Japan | 264/331.13 |
| 12809 | 1/1984 | Japan | 264/331.11 |
| 45138 | 3/1984 | Japan | 264/331.13 |
| 96413 | 5/1985 | Japan | 264/331.13 |
| 1-146708 | 6/1989 | Japan | 264/322 |
| 697346 | 11/1979 | U.S.S.R. | 264/331 |
| 2098533 | 11/1982 | United Kingdom | 264/331.13 |

*Primary Examiner*—Karen Aftergut
*Attorney, Agent, or Firm*—Spensley Horn Jubas & Lubitz

[57] ABSTRACT

A process formulation and apparatus for producing formed parts of polymeric binders and elastic or inflexible particularized ingredients. A formulation for forming a formed material upon the application of heat and pressure comprising a mixture of: (a) 75 to 95.5 wt. % of elastic or inelastic particles; (b) 2.5 to 25.0 wt. % of a polymer binder; (c) 0 to 20.0 wt. % of a coloring pigment; and (d) 0.1 to 0.5 wt. % of a catalyst.

10 Claims, 4 Drawing Sheets

PROCESS FOR PRODUCTION OF PRODUCTS FORMED OF POLYMER BONDED AND GRANULATED PARTICLES

FIELD OF THE INVENTION

This invention pertains to a novel process for producing formed parts consisting of elastic or inflexible particulated ingredients and polymeric binder. More particularly, this invention relates to a novel process for the accelerated production of formed parts comprising elastic or inelastic particles and polymer binders such as polyurethane or polyacrylate and elastic or inelastic substrates. Colouring agents and catalysts can be included.

BACKGROUND OF THE INVENTION

Presently available techniques for producing formed parts of particulate material and polymer binders utilize cold or warm pressing procedures conducted at ambient pressures. Cold and warm procedures are used about equal volume in the production of formed parts from polymer adhesives and pulverized ingredients or substances of elastic or inelastic material.

In cold part forming, a polymer binder and, for example, an elastic ingredient are typically combined under pressure at room temperature (+20° C.). A disadvantage with this process is that a very long forming time is required, usually more than 12 hours. In warm press forming, process times are accelerated by using temperatures of about +70° to +90° C. However, the length of the form time is still relatively slow. Typical times are more than 30 minutes.

The polymeric adhesives (binders) that are used in these processes are typically any one of a group of adhesives that set over time at room temperature or more rapidly at elevated temperatures. The elastic particulated ingredients are typically elastomeric type substances and can include fragmented rubber. The generally inelastic ingredients can be granulated cork, polyvinyl chloride granules, wood particles, or the like.

U.S. Pat. No. 4,852,812, granted Aug. 1, 1989, Penner, discloses an apparatus and method for preparing fragments from tire casings. An umbrella type tire casing support is provided in the process. An electric motor rotates the tire casings so that a cutter can convert the tire casing into fragment portions. The cutter is mounted for slidable movement towards and away from the tire casing. This patent does not disclose a process or formulation for forming the tire fragments into a bound product.

SUMMARY OF THE INVENTION

The present invention produces formed parts from polymeric adhesives and elastic and/or inelastic ingredients in a short forming time of less than 5 minutes. The elastic and/or inelastic ingredients are usually waste industrial products such as ground or shredded rubber, cork granules or polyvinyl chloride particles. The formed parts are obtained by mixing polymeric adhesive binder and granulate ingredients and then pressing the mixture of binder and granulate under high pressure at a basic temperature of +90° C. Steam of +110° to +120° C. can be added to accelerate curing.

The invention is directed to a process and/or formulation for forming a composite material upon the application of heat and pressure. The formulation comprises a mixture of: (a) 75 to 95.5 wt. % of elastic or inelastic particles; (b) 2.5 to 25.0 wt. % of a polymer binder; (c) 0 to 20.08 wt. % of a colouring pigment; and (d) 0.1 to 0.5 wt. % of a catalyst. The process comprises placing the formulation in a mold and applying heat and pressure to the material. Steam can be added to accelerate curing.

The elastic or inelastic particles may be of a material selected from the group consisting of granulated rubber, granulated cork, granulated polyvinylchloride polymer, and granulated sawdust. The particles may be between the size range of 0.1 to 8.0 mm.

The polymer binder may be selected from the group consisting of a one or two component polyurethane and a one or two component polyacrylate resin system. The granulated rubber may comprise shredded rubber tire casings. The elastic granulate may comprise shredded neoprene.

The colouring agent may be red iron oxide or chrome oxide and can be added to the polymer glue (b). The catalyst may be tap water or purified water which is introduced as a dispersion into the formulation. The granulated material may be granulated cork. The curing of the polymer binder can be accelerated by introducing steam into the mixture.

The mixture used in the process or formulation can be subjected to a pressure of between about 25 to 160 bars pressure. The mixture can be subjected to steam at a temperature between about 110° and 140° C. and a pressure between about 3 to 8 bars pressure.

An apparatus for continuously manufacturing and forming a cured product of granulate material, polymer glue, and catalyst, comprising: (a) a granulator mill which is adapted to shred elastic or inelastic material into small granules and pass them to a continuous mixer means; (b) continuous mixer which is adapted to continuously mix a specified amount of inelastic or elastic granulated material, a specified amount of polymer glue, and a specified amount of catalyst; and (c) a mold press which receives mixed material from mixer (b) and molds the mixed material under elevated pressure and temperature into a formed cured product. The apparatus can include a steam generator (d) which generates steam for addition to the process to accelerate curing.

The granulator mill may have on the top thereof a hopper which receives material to be shredded into granulated particles and a moving cutting knife means located at the exit of the hopper for cutting the material into granulated particles. The material, after it is passed through the cutting knife, can be passed through a screening device which separates oversized particles from the material cut by the cutting knife. The mold press can be constructed of a press, an upper mold carrier, and a lower mold carrier, and is adapted to receive mixed material from the mixer means (b) and cure the mixed material into a formed product under high pressure and temperature, and optionally steam.

DRAWINGS

In the drawings which depict specific embodiments of the invention, but which should not be construed as restricting the spirit or scope of the invention in any way:

DETAILED DESCRIPTION OF SPECIFIC EMBODIMENTS OF THE INVENTION

Figure 1:
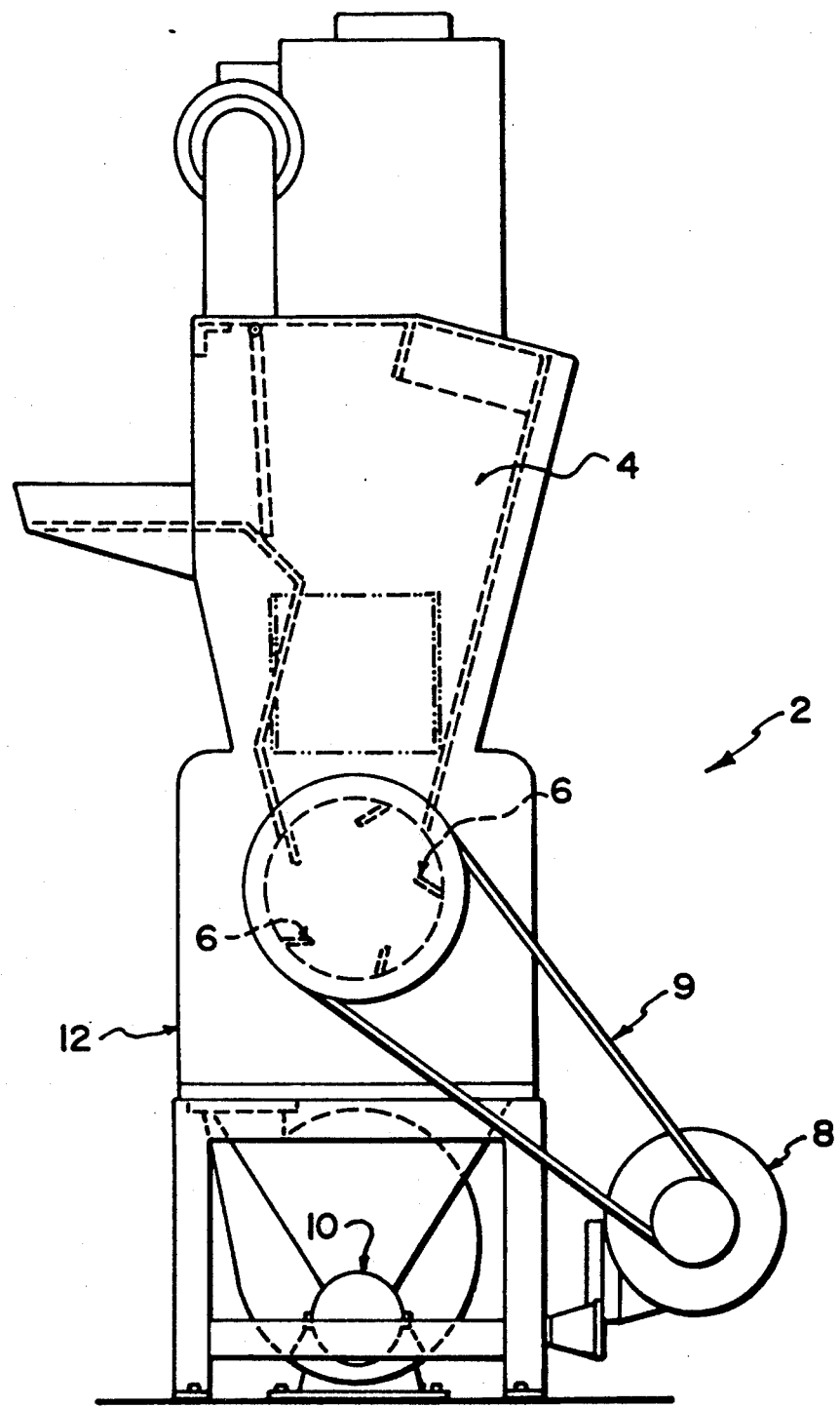
FIG. 1 illustrates an end elevation view of a granulator mill.

The process of the invention permits a solid material to be formed from a mixture of particulate elastic or inelastic materials, a polymeric binder, and a catalyst which promotes the curing of the polymer binder. The material is formed by the application of heat and pressure according to specified parameters. The particulated material can be granulated rubber, granulated cork, granulated polyvinylchloride, granulated sawdust, shredded neoprene or shredded ethylenepropylenediene polymerizate. The polymerized ethylenepropylenediene can be obtained from MELOS Carl Bosch GmbH & Co., D-4520 Melle 1—West Germany. Shredded rubber can be obtained from Rubber Granulators Inc., 12701 Mukilteo Speedway, P.O. Box 692, Everett, Washington 98204, U.S.A., or B.R.G. International Ltd., Hillgate Industrial Estate, Hillgate Stockport, Cheshire, SKl 3JW, England, or North/West Rubber, Vancouver, British Columbia, Canada.

The polymer binder can be a polyurethane one-shot binder available from Dow Chemical (Europe) under the trademark SPORTELAST-4250/1, Frankfurt, West Germany. Alternatively, the polymer binder can be obtained from STAC, France, under the trade-mark POLYSTAC, 5775. In one form, the catalyst can be high pressure steam.

Machinery for granulating rubber and other shreddable products can be obtained from Alpine AG, 8900 Augsburg 1, P.O. Box 101109, West Germany, or Condux Werk, 6451 Wolfgang by Hanau, West Germany.

In the manufacture of such formed parts, several operating criteria may be varied within the following parameters to achieve a solid and stable cured product in 3 to 4 minutes.

1. Recipe of Ingredients

| | |
|---|---|
| granulate | 75.0 to 97.5 wt. % |
| polymer glue | 2.5 to 25.0 wt. % |
| colour | 0 to 20.0 wt. % |
| catalyst | 0.1 to 0.5 wt. % |

2. Granulate or Relative Screen Size

Granulate particles of 0.1 to 0.5 mm size provide a product which has a fine surface texture. Particles of 1.0 to 4.0 mm size provide an intermediate product having the general surface appearance of concrete blocks or rough bricks and is suitable for most applications. Granulate of 3.0 to 8.0 mm size is possible, and provides a coarse product having the appearance of pavement.

3. General Combinations of Mechanical and Steam Pressures

Mechanical pressures of 30 to 160 bar and 3 to 8 bar steam pressure provide an acceptable product.

In a preferred embodiment of the invention, the formed parts are manufactured using the following ingredients: (a) 75.0 to 97.5 wt. % elastic and/or inflexible particles, e.g. rubber granulate, polymerized ethylenepropylenediene granules, neoprene granules, or other shredded materials such as cork or granulated polyvinylchloride; (b) 2.5 to 25.0 wt. % polymer binder, e.g. polyurethane or polyacrylate (as a one or two component product); (c) 0 to 20.0 wt. % colouring agent (based on organic or inorganic substances); and (d) 0.1 to 0.5 wt. % catalyst.

The advantages of this newly developed process are that it provides efficient production, it has a beneficial cost structure, and it provides rapid curing times. The formed parts that are produced according to the invention have a number of uses including, but not restricted to: long wearing resilient sports surfaces, indoor and outdoor; indoor or outdoor playground surfaces; and interior and exterior protection of buildings. The formed parts can be made up of a cured mixture of elastic and/or inflexible particles and a polymer glue, which cures on the application of heat.

Referring to FIG. 1 which illustrates an end elevation view of a granulation mill 2, roughly fragmented industrial waste products (e.g. rubber, cork, PVC) are contained in an upper hopper 4 and are fed down and shredded into small pieces (0.1 to 8.0 mm size) by rapidly rotating cutting knives 6 in the granulator mill 2. The knives 6 are driven by belts 9 connected to motor 8. The granulate or shredded material is then cooled, as it passes down through the mill 2. Once cooled, it passes through a screen 10, which is soundproofed by soundproofing 12, and augered into a "continuous" mixer 14 (not shown in FIG. 1 but see FIG. 2).

Figure 2:
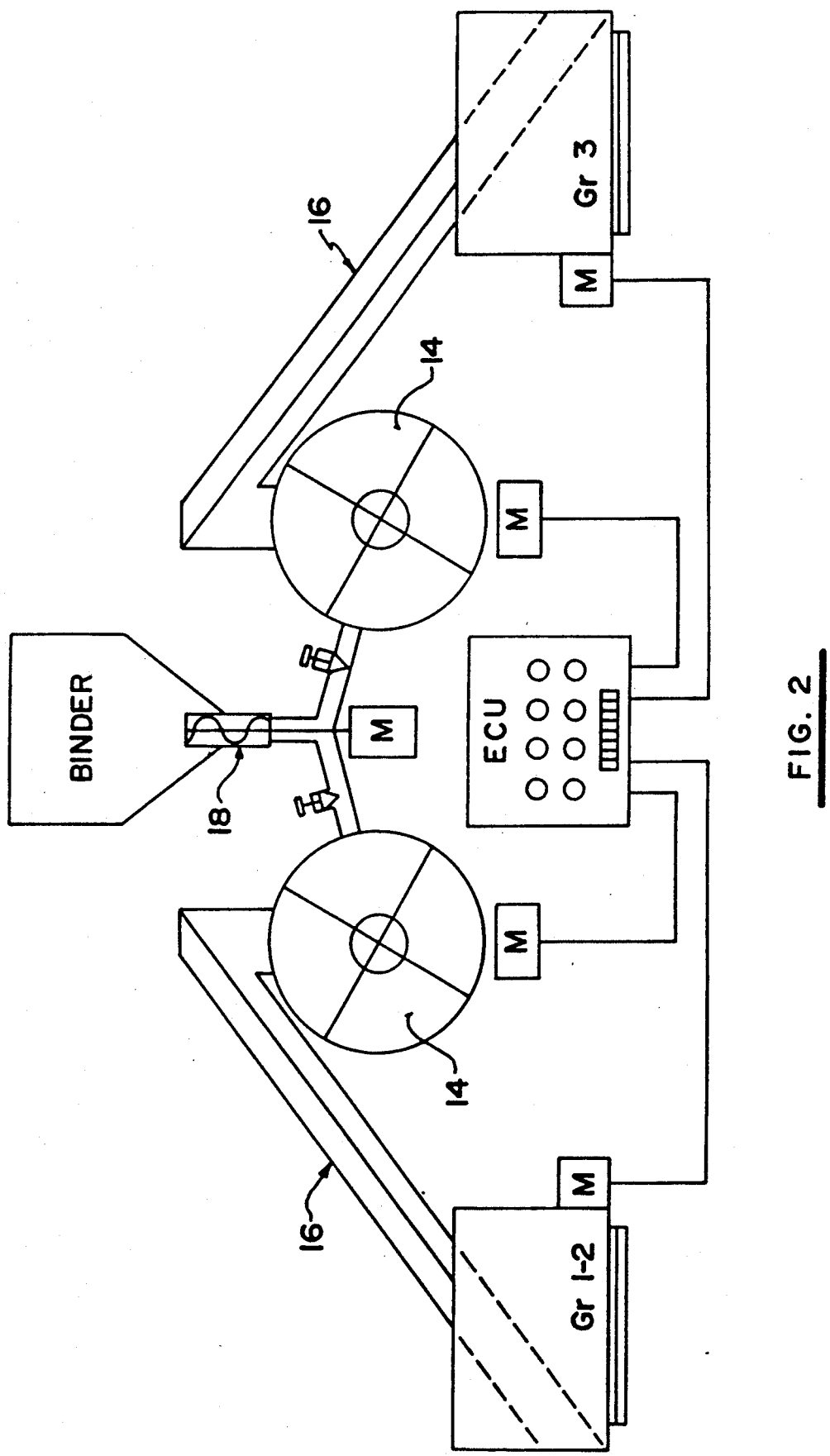
FIG. 2 illustrates a functional schematic of a continuous mixer with three granulate hoppers, a tank for polymeric additives and an electrical control unit.

FIG. 2 illustrates a functional schematic of two continuous mixers 14, with three granular hoppers. The mixers 14 are equipped with dosing augers 16, which add the granulate in measured amounts. A dosing pump 18 adds a polymer binder to the mixers. The design of each mixer 14 allows for the inclusion of a reagent (not shown) which serves the purpose of speeding up the chemical curing or setting reaction. Mixer 14 is equipped with and directed by an electronic control unit (ECU) which by sensors identified with the letter "M" controls the continual mixing of different amounts of the basic ingredients, according to recipe. Proportional to mold size, the proper corresponding amounts of ingredients can be called for simply by pressing buttons. It will be understood that FIG. 2 is merely a functional schematic and any specific design which serves the purpose is feasible.

After blending, the blended mixture of ingredients is transferred from the mixers 14 into heated molds 21 and 24 (see FIG. 3 which illustrates a front elevation view of a mold and press which are heated to $+90°$-$+120°$ C.) and is distributed by a special mold press 20. Pressure on the mold 20 and contained mixture is maintained automatically by controls 23 and pressure settings 22 and may be varied from 25 to 160 bars pressure.

During the forming (curing) phase, high pressure steam generated by a steam generator 25 (see FIGS. 4 and 5) is directed onto the surface of the mixture in the mold 20. Steam at a temperature of $+110°$ to $+120°$ C. and a pressure of about 3 to 8 bars forces the steam through the mixture and accelerates the chemical curing reaction thus reducing the hardening (curing) time to 3 to 4 minutes.

Figure 5:
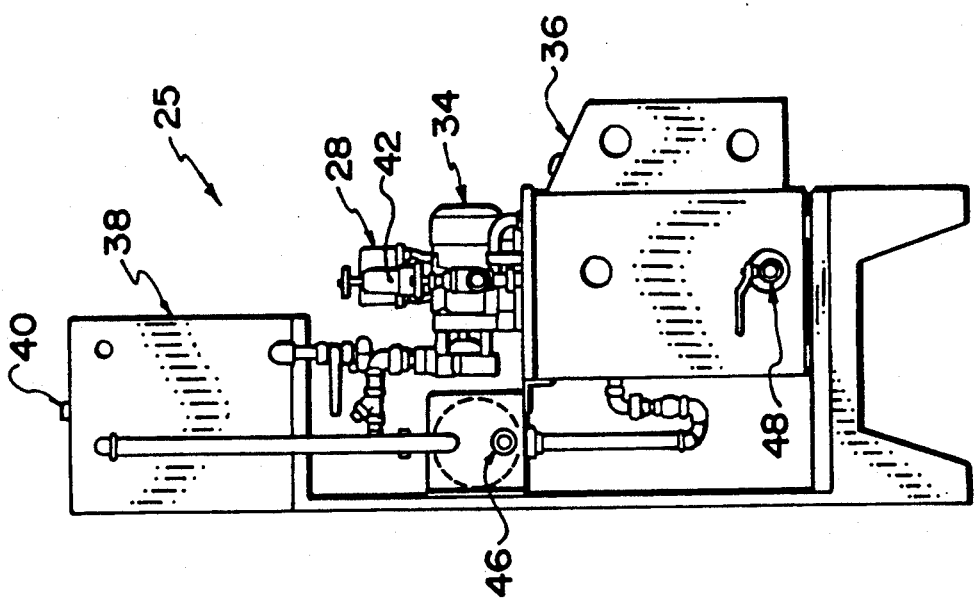
FIG. 5 illustrates an end elevation view of a steam generator.
Figure 4:
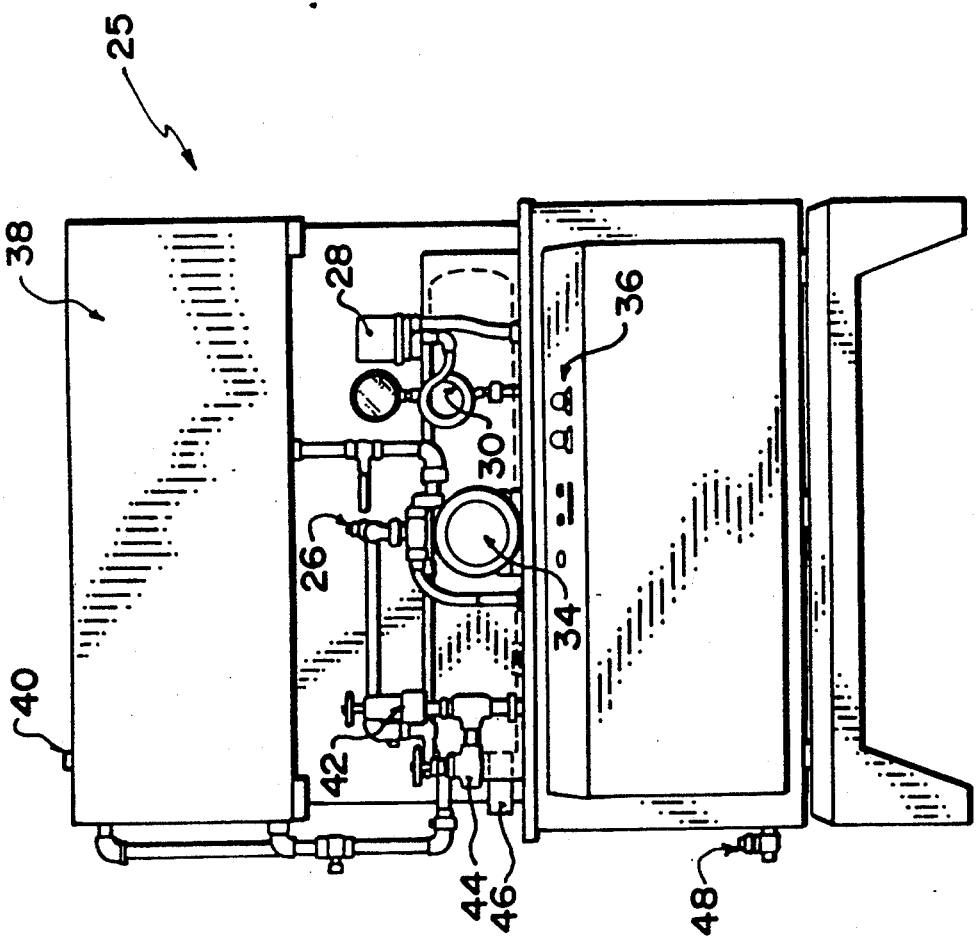
FIG. 4 illustrates a side elevation view of a steam generator.

The steam generator 25 illustrated in FIGS. 4 and 5 is constructed so that it has a back pressure valve 26, a pressure control 28, a trumpet pipe 30, a heat exchanger 32 and a water pump 34. The operating criteria of the steam generator 25 is controlled via control panel 36. Water which is converted into steam is contained in water tank 38. A steam port 40 is located at the top of the water tank 38. A safety valve 42 and a steam valve 44 prevent a hazardous situation from being reached. FIG. 4 specifically illustrates a condensate entrance 46 and a sludge valve 48, which can be used to withdraw unwanted waste material.

The molds 20, and their supporting legs, are designed so that holes (not shown) are formed through the top side and the legs to allow the entrance of steam around the mold. Applying high amounts of steam (40 to 90 kg per hour) assures a continual and well distributed curing reaction even when complicated or asymmetrical molds are used. It is important for thorough cure throughout the entire formed product that the steam penetrate through and permeate the formed product.

The equipment described above is used to carry out an accelerated procedure for manufacturing formed parts using granulated material, polymer binder, colour pigment and catalyst.

EXAMPLE

Figure 3:
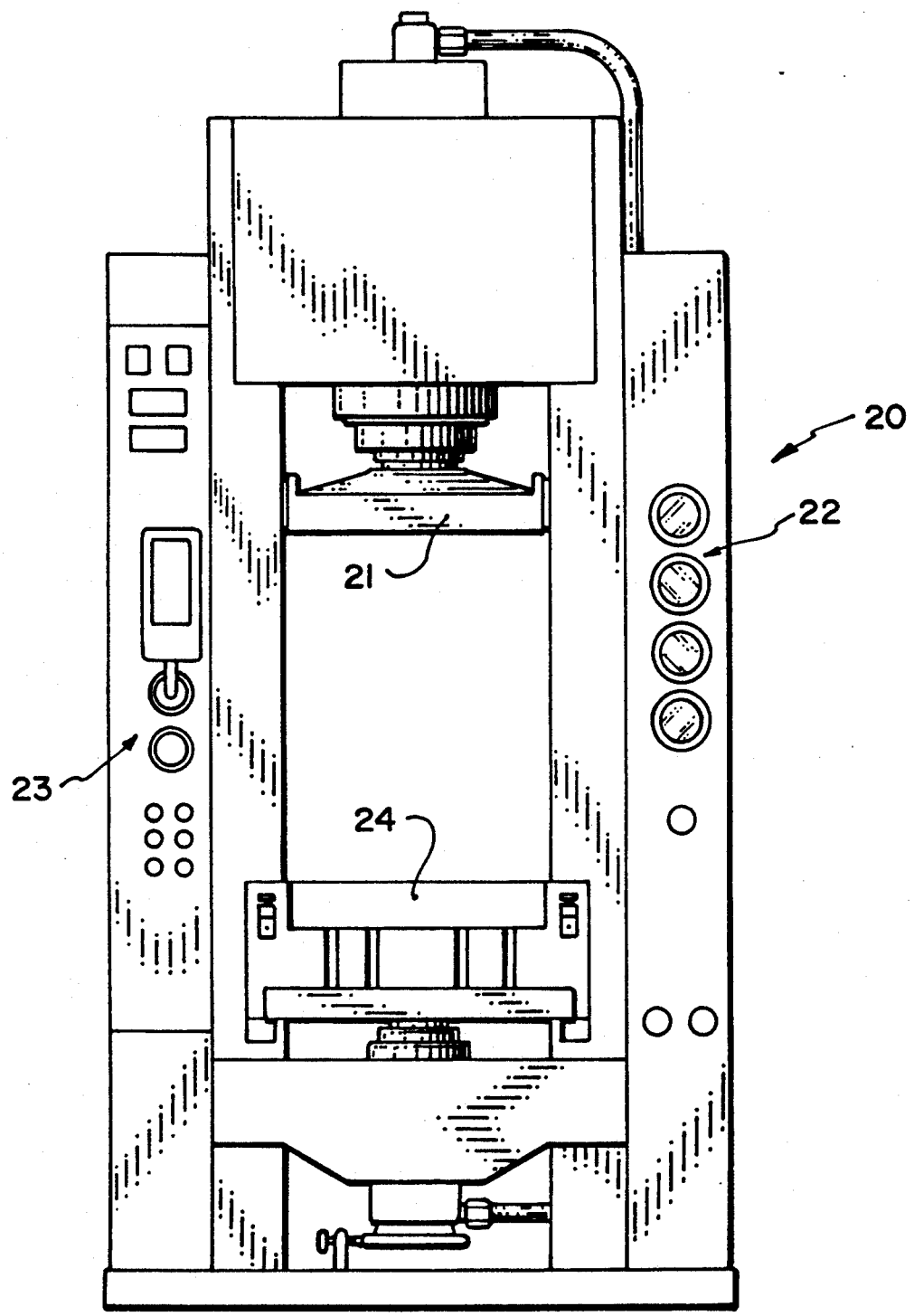
FIG. 3 illustrates a front elevation view of a mold and press.

A 50 cm×50 cm tile made up of granulated rubber, polyurethane binder, and catalyst, 50 mm thick, was formed in an apparatus as illustrated in FIG. 3, and discussed in the disclosure herein. Forty-five L/hr. of 140° C. steam were applied to the mold. The pressure of the steam was about 4.3 bars. The temperature of the steam at the mold was about 110° C. The granulated rubber and polyurethane binder, when first placed in the mold, was about 100 mm deep. After the application of steam at 4.3 bars and 110° C., and the application of pressure by the press of about 100 bars, the thickness of the granulated material was reduced to about 50 mm thickness.

The granulated rubber used in the tile was obtained from Rubber Granulators Inc., Seattle, Washington, U.S.A. The one component polyurethane binder was obtained from Dow Chemical (Europe), Frankfurt, West Germany, under the trade-mark SPORTELAST-4250/1. The polyurethane, according to best available information, was a mixture of methyldiisocyanate and a polyol of a chain length of about 2,000 MW.

Since chemical polymerization must take place throughout the mixture, it is important for proper curing of the pressed rubberized-binder material that the steam penetrate through the entire material. Otherwise, a product is obtained wherein the centre of the product is not properly cured and properties are inferior. The steam at 4.3 bars pressure is introduced into the mold from the top, and migrates through the pressed particulate material before exiting from the bottom of the mold.

A strong, resilient, aggregate material measuring about 50 cm×50 cm per side and 50 mm in thickness was produced after a cure time of about 4 minutes. The product obtained was a rough-surfaced tough resilient tile suitable for use as a tough skid-resistant sports or recreation surface.

Based on the foregoing results, and with larger molds, it should be possible to produce formed products of about 1 m² in area, and 45 cm in thickness without departing from the spirit and scope of the invention.

The amount of steam, and the pressures and temperatures thereof, required for effective operation of the process, is roughly proportional to the amount of binder and the quantity of particles that make up the product that is being formed. Indirectly, this is also governed by the size of the mold.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. A process of forming a compressed cured material from a mixture comprising:
   (a) about 75 to 95.5 weight % of elastic or inelastic particles of a substance selected from the group consisting of granulated rubber, polymerized ethylenepropylenediene, neoprene, granulated cork, granulated polyvinylchloride and granulated sawdust, wherein the particles are of a size range of about 0.1 to 8.0 mm;
   (b) about 2.5 to 25.0 weight % of a polymer binder selected from the group consisting of a one or two component polyurethane system and a one or two component poly-acrylate resin system;
   (c) about 0 to 20.0 weight % of a colouring pigment selected from the group consisting of iron oxide and chrome oxide; and
   (d) about 0.1 to 0.5 weight % of water as a catalyst, the proportions of (a), (b), (c) and (d) adding up to 100% weight, which process comprises placing the mixture in a mold and applying heat in a form of steam at a temperature between 110° C. and 140° C. and at a pressure between about 3 to 8 bars and at a rate between 40 to 90 kg per hour to the mixture, and applying pressure of between about 25 to 160 bars to the mixture to compress the mixture and effect a cure of the mixture and thus form the compressed cured material.

2. A process as claimed in claim 1 wherein the granulated rubber comprises shredded rubber tire casings.

3. A process as claimed in claim 1 wherein the elastic particles are shredded polyethylenepropylenediene.

4. A process as claimed in claim 1 wherein the elastic particles are shredded neoprene.

5. A process as claimed in claim 1 wherein the colouring pigment is red iron oxide and is incorporated with the polymer binder (b).

6. A process as claimed in claim 1 wherein the colouring pigment is chrome oxide and is incorporated with the polymer binder (b).

7. A process as claimed in claim 1 wherein the water catalyst is introduced as a dispersion into the mixture.

8. A process as claimed in claim 1 wherein the catalyst is purified water which is introduced as a dispersion into the mixture.

9. A process as claimed in claim 1 wherein the particles are granulated cork.

10. A process of forming a compressed cured product from a mixture comprising:
    (a) between about 75 to 95.5 weight % of granulated rubber of a size range of about 0.1 to 8.0 mm;
    (b) between about 2.5 and 25.0 weight % of a one shot polyurethane binder formed from a mixture of methyl diisocyanate and a polyol of a chain length of about 2,000 molecular weight;
    (c) between about 0 to about 20.0 weight % of iron oxide; and
    (d) about 0.1 to 0.5 weight % of a catalyst, to add up to 100 weight %; which process comprises, (e) placing the mixture in a mold;
(f) applying steam at a temperature of about 140° C. and a pressure of about 4.3 bars to the mold at a rate of 40 to 90 kg per hour, and maintaining the temperature of the steam at the mold at about 110° C.;
(g) applying a pressure to the mixture of about 100 bars to compress the mixture to a thickness of about 50% of its original height; and
(h) removing the compressed cured mixture as the product from the mold after steam and pressure have been applied to the mixture for about 4 minutes.

* * * * *